United States Patent Office 2,859,242
Patented Nov. 4, 1958

2,859,242

N-[2-(PENTACHLOROANILINO)-ETHYL] CARBOXAMIC ACIDS

Clarence L. Moyle, Clare, Mich., and Clifford L. Meints, Indianola, Iowa, assignors to The Dow Chemical Company, Midland, Mich., a corporation of Delaware No Drawing. Application October 4, 1957
Serial No. 688,138

4 Claims. (Cl. 260—518)

This invention concerns a group of novel N-[2-(pentachloroanilino)-ethyl] carboxamic acids having the formula

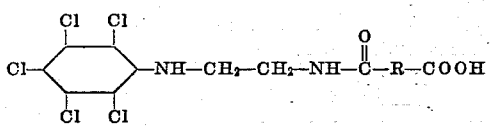

In this and succeeding formulas, R represents a divalent hydrocarbon radical containing from one to four carbon atoms, inclusive. These compounds are crystalline solids which are of low solubility in water, soluble in aqueous solutions of alkali, and somewhat soluble in many organic solvents. The new compounds are useful as parasiticides and are adapted to be employed as active toxic constituents of compositions for the control of many insect and bacterial pests. The compounds are also useful as additives to lubricants to improve their high-pressure lubricating properties.

The new carboxamic acids of this invention may be prepared by causing N-pentachlorophenylethylenediamine to react with a lower aliphatic dicarboxylic acid or an inner anhydride of said dicarboxylic acid. Suitable lower-aliphatic dicarboxylic acids include fumaric acid, malonic acid, succinic acid, maleic acid, glutaric acid, adipic acid, glutaconic acid, itaconic acid, muconic acid, β-hydromuconic acid, and citraconic acid. The reaction is carried out in the presence of an inert solvent such as benzene, xylene, or dioxane. Good results are obtained when employing substantially equimolecular proportions of the N-pentachlorophenylethylenediamine and dicarboxylic acid or acid anhydride.

In carrying out the reaction between the N-pentachlorophenylethylenediamine and aliphatic dicarboxylic acid anhydride, the reactants are mixed and blended together in the reaction solvent and the resulting mixture maintained for a period of time at a temperature within the range of from 30° to 100° C. During the reaction, the desired product may precipitate in the reaction mixture as a crystalline solid. Upon completion of the reaction, the reaction mixture may be cooled to precipitate the desired product or to precipitate further product and the product thereafter separated by filtration or decantation. The product may be further purified in well-known ways such as by recrystallization from a suitable organic solvent.

In carrying out the reaction between the N-pentachlorophenylethylenediamine and the lower-aliphatic dicarboxylic acid, the reactants are mixed and blended together and the resulting mixture heated for a period of time at a temperature within the range of from 100°–200° C. Upon completion of the reaction, the reaction mixture may be treated as previously described to separate the desired product as a crystalline solid.

The following examples merely illustrate the invention and are not to be construed as limiting:

*Example 1.—N-[2-(pentachloroanilino)ethyl] maleamic acid*

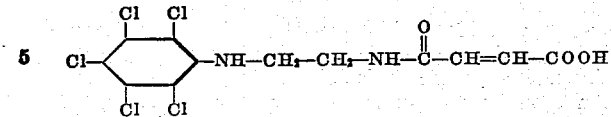

N-pentachlorophenylethylenediamine (30.85 grams; 0.1 mole) was added in small portions with stirring to 9.8 grams (0.1 mole) of maleic anhydride dissolved in 50 milliliters of benzene. The addition was carried out at a temperature of from 40°–45° C. and during a period of 15 minutes. Stirring was thereafter continued and the mixture heated at 50°–55° C. for a half hour to complete the production of an N-[2-(pentachloroanilino)-ethyl] maleamic acid product. The reaction mixture was then neutralized with 1500 milliliters of aqueous 0.25 percent sodium hydroxide and the neutralized mixture filtered to separate water insoluble impurities. During the neutralization, the N-[2-(pentachloroanilino)ethyl] maleamic acid was converted to its sodium salt. The filtrate was then acidified with aqueous hydrochloric acid to convert the salt to the desired acid product. During the acidification, an N-[2-(pentachloroanilino)ethyl] maleamic acid product precipitated as a crystalline solid and was separated by filtration and dried. The dried product was found to melt at 179° C. and have a chlorine content of 43.36 percent as compared to a theoretical content of 43.6 percent.

*Example 2.—N-[2-(pentachloroanilino)-ethyl] succinamic acid*

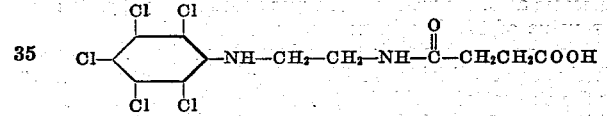

N-pentachlorophenylethylenediamine (30.85 grams; 0.1 mole) was added in 5 gram portions to a solution of 12 grams (0.12 mole) of succinic anhydride dissolved in 150 milliliters of dry benzene. The reactants were combined during a period of 15 minutes at a temperature of from 20° to 67° C. When the addition was completed, the mixture was heated to 70° C. and stirred for ten minutes to carry the reaction to completion. The mixture was then cooled to 40° C. whereupon an N-[2-(pentachloroanilino)ethyl]-succinamic acid product precipitated in the mixture as a crystalline solid. This product was removed from the mixture by filtration, washed with benzene and recrystallized from aqueous 33 percent acetic acid. The recrystallized product was cream colored and melted at 136.7°–138° C.

*Example 3.—N-[2-(pentachloroanilino)ethyl] glutaconamic acid*

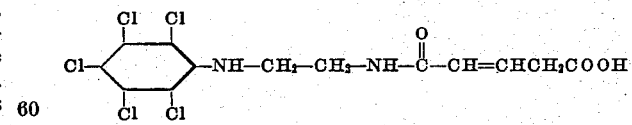

N-pentachlorophenylethylenediamine (30.85 grams; 0.1 mole) is combined portionwise over ten minutes with stirring with 15.81 grams (0.1 mole) of glutaconic acid dissolved in 100 milliliters of dioxane. The resulting mixture is then heated to boiling (105° C.) and maintained under reflux for a half hour to carry the reaction to completion. The heated mixture is then cooled, and thereafter diluted with one liter of water. During the dilution an N-[2-(pentachloroanilino)ethyl] glutaconamic acid product precipitates in the mixture as a crystalline solid, and is recovered by filtration. N-[2-

(pentachloroanilino)ethyl] glutaconamic acid has a molecular weight of 396.52.

In a similar manner, other N[2-(pentachloroanilino)ethyl] carboxamic acids may be prepared as follows:

N-[2-(pentachloroanilino)ethyl] adipamic acid by reacting together N-pentachlorophenylethylenediamine and adipic acid;

N-[2-(pentachloroanilino)ethyl] β-hydromuconamic acid by reacting together N-pentachlorophenylethylenediamine and β-hydromuconic acid:

An example of a utility of the compounds of this invention is found in the employment of N-[2-(pentachloroanilino)ethyl] maleamic acid as an additive to lubricants to improve their high-pressure lubricating properties. In the testing of such boundary-type lubricants a standard procedure is to supply the lubricant which is being tested to a steel chamber confining four uniform steel balls in the form of a pyramid, three in a triangle supporting the fourth. Known downward pressure is applied to the pyramid by pressure on the top ball, and, under such pressure, a rotational motion is imparted to the balls such that the top ball counter-rotates relative to one or more of those below. A standard embodiment of this test is to determine the load at which the friction and heat produced by counter-rotation among the balls in the presence of a lubricant to be tested induces virtually instantaneous welding of the four balls into a unit structure. The load is known as the "welding load." The magnitude of this "welding load" is a measure of the effectiveness of the test compound as a lubricant additive. In a representative operation a base lubricant test material, a mixture of 2-butoxyethanol and tetraethyleneglycol gave a welding load of 90 kilograms under the conditions of this test. When the base lubricant material was modified by the addition of 10 percent N-[2-(pentachloroanilino)ethyl] maleamic acid, the welding load was substantially doubled to a value of 170 kilograms.

These new carboxamic acids have been found to be effective as parasiticides and are adapted to be employed for the control of a wide range of agricultural and household pests. For such use, the products may be dispersed on a finely divided solid and employed as dusts. Also, such mixtures may be dispersed in water with the aid of a wetting agent and the resulting aqueous suspensions employed as sprays. In other procedures, the products may be employed in oils, as constituents of oil-in-water emulsions, or in water dispersions with or without the addition of dispersing or emulsifying agents. In a representative operation, N-[2-(pentachloroanilino)ethyl] succinamic acid was employed in the control of wheat rust. In such operation, the application of aqueous compositions containing 0.0625 percent by weight of the said succinamic acid compound to growing wheat plants gave virtually complete protection from a heavy inoculation with spores of wheat rust.

N-pentachlorophenylethylenediamine employed as an intermediate in the production of the substituted carboxamic acids of this invention may be prepared by causing a reaction between equimolecular proportions of ethylene diamine and hexachlorobenzene. This reaction is brought about by contacting the reactants together portionwise at the boiling temperature (117° C.) of ethylene diamine. Upon completion of the reaction, the reaction mixture is cooled to room temperature and may then be diluted with water. During the dilution, the desired diamine precipitates in the mixture as a crystalline solid and is separated by filtration or decantation. N-pentachlorophenylethylenediamine is a white, crystalline solid melting at 91°–93° C.

We claim:

1. An N-[2-(pentachloroanilino)ethyl] carboxamic acid corresponding to the formula

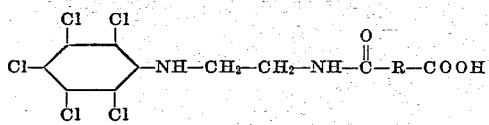

wherein R represents a divalent hydrocarbon radical containing from one to four carbon atoms, inclusive.

2. N-[2-(pentachloroanilino)ethyl] malemic acid.

3. N-[2-(pentachloroanilino)ethyl] succinamic acid.

4. A method for the production of a carboxamic acid of the formula

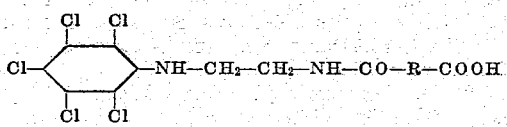

wherein R represents a divalent hydrocarbon radical containing from one to four carbon atoms inclusive, which comprises causing N-pentachlorophenylethylenediamine to react with a member selected from the group consisting of the lower aliphatic dicarboxylic acids and their inner anhydrides.

No references cited.